United States Patent
Hodder (12) United States Patent (10) Patent No.: US 7,612,897 B2
Hodder (45) Date of Patent: Nov. 3, 2009

(54) METHOD OF MANAGING THE PRINTING OF CHARACTERS AND A PRINTING DEVICE EMPLOYING METHOD

(75) Inventor: Leonard B. Hodder, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 948 days.

(21) Appl. No.: 10/949,546

(22) Filed: Sep. 24, 2004

(65) Prior Publication Data
US 2006/0069992 A1 Mar. 30, 2006

(51) Int. Cl.
G06K 15/02 (2006.01)
G06T 11/00 (2006.01)
G06F 3/02 (2006.01)

(52) U.S. Cl. ............... 358/1.11; 358/1.16; 345/469; 345/171

(58) Field of Classification Search ......... 358/1.11; 345/467–472.3, 171
See application file for complete search history.

(56) References Cited

U.S. PATENT DOCUMENTS

| | | | | |
|---|---|---|---|---|
| 5,251,293 A | | 10/1993 | Ishii et al. | |
| 5,468,077 A | * | 11/1995 | Motokado et al. | 400/76 |
| 5,673,371 A | * | 9/1997 | Koopman et al. | 358/1.11 |
| 5,689,723 A | * | 11/1997 | Lim et al. | 715/234 |
| 5,721,812 A | * | 2/1998 | Mochizuki | 358/1.11 |
| 5,729,666 A | * | 3/1998 | Konsella et al. | 358/1.11 |
| 5,835,100 A | | 11/1998 | Matsufusa | |
| 5,964,885 A | * | 10/1999 | Little et al. | 714/2 |
| 6,157,905 A | * | 12/2000 | Powell | 704/2 |
| 6,252,671 B1 | * | 6/2001 | Peng et al. | 358/1.11 |
| 6,583,789 B1 | * | 6/2003 | Carlson et al. | 345/471 |
| 6,856,317 B2 | * | 2/2005 | Konsella et al. | 345/471 |
| 2001/0055507 A1 | * | 12/2001 | Tobita | 400/76 |
| 2004/0205667 A1 | * | 10/2004 | Hsu | 715/531 |
| 2004/0257591 A1 | * | 12/2004 | Engelman et al. | 358/1.1 |

OTHER PUBLICATIONS

Charles Lin, Character Representation: ASCII, EBCDIC, and Unicode, Mar. 6, 2003.*

* cited by examiner

*Primary Examiner*—Mark K Zimmerman
*Assistant Examiner*—Mesfin Getaneh (57) ABSTRACT

In a printing device storing a plurality of font files, at least a first font file storing glyph data corresponding to a first set of characters, characters of the first set being represented by double-byte words and at least a second font file storing glyph data corresponding to a second set of characters, characters of the second set being represented by single-byte words, a method of managing the printing of characters comprises upon receipt of a double-byte word, determining whether the received double-byte word represents a character that is also in the second set of characters. If not, the double-byte word is used to extract glyph data from the first font file. If so, data of the double-byte word is used to extract glyph data from the second font file.

39 Claims, 4 Drawing Sheets

METHOD OF MANAGING THE PRINTING OF CHARACTERS AND A PRINTING DEVICE EMPLOYING METHOD

FIELD OF THE INVENTION

The present invention relates generally to printing devices and in particular, to a method of managing the printing of characters and a printing device employing method.

BACKGROUND OF THE INVENTION

Stand-alone electronic cash registers including payment card readers and receipt printers have been used for years in stores, retail outlets and service outlets to facilitate the completion of cash, cheque, credit card or debit card transactions for the purchase of goods and/or services. With the advent of sophisticated and inexpensive computing equipment, input devices and secure communication networks, point-of-sale (POS) stations have become an increasingly popular alternative.

POS stations typically include a host device and a plurality of interchangeable peripherals connected to the host device. The host device and peripherals are easily integrated allowing the configuration of POS stations to be modified to meet changing needs. This has been another factor leading to their widespread acceptance. The host device is commonly in the form of a personal computer. The peripherals often include a keyboard, a display screen, a cash drawer, a printing device, a payment card reader and a barcode reader. In some cases, a touch-sensitive display screen is used instead of separate keyboard and display screen peripherals.

As is well known, the host device communicates with the peripherals and executes software to allow product and/or service transactions to be completed. When payment is effected using a debit or credit card, the host device establishes a connection to the appropriate financial institution over an information network so that approval for the transaction may be obtained. Upon completion of any transaction, the host device creates and sends a print job to the printing device causing the printing device to generate a transaction receipt and a possibly signing receipt, if payment is made using a credit card.

During creation of the print job, the host device creates a character string including the data bytes representing the characters to be printed and transmits the string to the printing device in a data stream. Depending on the nature of the characters to be printed, each character code in the data stream may be represented by a single data byte if standard (i.e. Latin) characters are to be printed, or as a data byte pair, if larger or complex (i.e. multilingual) characters are to be printed. The host device also sends not-printable command codes to the printing device in a command string to control printer operation.

The printing device stores one or more font files relating to different character sets. When a data stream is received by the printing device, the printing device uses the font file corresponding to the characters to be printed. Glyph data in the selected font file is extracted as the character codes are received allowing the characters to be printed.

Representing multilingual characters with character codes presents challenges due to the complexity and size of a significant number of the multilingual characters. As a result, different techniques for representing multilingual characters have been considered. For example, U.S. Pat. No. 5,835,100 to Matsufusa discloses a method and system for displaying characters composed of multiple juxtaposed images designed to mitigate the problem of slower display speeds when displaying kana or kanji characters sent to a display adapter. Such characters are typically sent in graphics form because of their non-standard size. Multilingual characters are divided into horizontal halves and stored. The image codes corresponding to the horizontal halves of the multilingual characters are written to a display buffer in adjacent locations in order to form the whole multilingual character for display.

U.S. Pat. No. 5,251,293 to Ishii et al. discloses a character display apparatus that provides Chinese characters in a text mode to a screen in order to increase the display speed and in such a way so as to ensure compatibility with world-wide standards. The display apparatus contains a judgement portion for determining when a desired character is designated by one or two character codes. Reading of the character is controlled based on the result of the judgement portion, which is dependent on the data defining the character itself. A detecting portion judges whether a retrieved character code represents a full-width character or a half-width character. When a character is full-width, an address-generating portion generates a two-byte address, based on the character code, pointing to the first and second portions of the full-width character. If the character code represents a half-width character, the address-generating portion generates a one-byte address pointing to the half-width character.

U.S. Pat. No. 5,468,077 to Motokado discloses a method and apparatus for combining multiple primitive patterns, to form characters as well as a method of blending characters in two different type faces by interpolation or combination, so as to create new type faces without having to design them from scratch.

U.S. Pat. No. 5,689,723 to Lim et al. discloses a method for allowing both a single-byte character set font and a double-byte character set font to be used in a double-byte character set code page. Documents are formatted so that single-byte and double-byte content is kept in separate areas of the documents. This enables a viewer program to distinguish easily between the content and select the appropriate display.

Although the above references disclose methods of representing large multilingual characters, improved methods of managing the printing of characters are desired. It is therefore an object of the present invention to provide a novel method of managing the printing of characters and a printing device employing the same.

SUMMARY OF THE INVENTION

Accordingly, in one aspect of the present invention there is provided a in a printing device storing a plurality of font files, at least a first font file storing glyph data corresponding to a first set of characters, characters of the first set being represented by double-byte words and at least a second font file storing glyph data corresponding to a second set of characters, characters of the second set being represented by single-byte words, a method of managing the printing of characters. During the method, upon receipt of a double-byte word, a determination is made as to whether the received double-byte word represents a character that is also in the second set of characters. If not, the double-byte word is used to extract glyph data from the first font file. If so, data of the double-byte word is used to extract glyph data from the second font file.

In one embodiment, the first set of characters includes multilingual characters and Latin characters and the second set of characters includes Latin characters. The multilingual characters may include Chinese, Korean and/or Japanese characters. A received double-byte word is determined to also represent a character from the second set if the double-byte word includes a null data byte.

The extracted glyph data is used to print the character. Prior to printing, the glyph data extracted from the second font file may be padded with spaces. The spaces may be placed to one side of the glyph data or on both sides of the glyph data. The spaces are sized so that during printing, the printed character is generally the same size as the characters in the first set.

According to another aspect of the present invention there is provided a printing device comprising a first font file storing glyph data corresponding to a first set of characters, characters of the first set being represented by multi-byte character codes and a second font file storing glyph data corresponding to a second set of characters, characters of the second set being represented by single-byte character codes. A processor receives character codes representing characters to be printed during a print job. When the character codes represent characters in the second set, the processor extracts glyph data from the second font file corresponding to the represented characters for printing. When the character codes represent characters in the first set, the processor examines each received character code to determine whether the character code represents a character that is also in the second set. If not, the processor extracts glyph data from the first font file corresponding to the represented character for printing and if so, the processor extracts glyph data from the second font file corresponding to the represented character for printing.

The present method provides advantages in that when standard characters forming part of a multilingual character set are to be printed, the glyph data for those characters is extracted from a standard character font file rather than from the multilingual character font file. As will be appreciated, printing multilingual characters sometimes require multiple printhead passes to achieve the desired resolutions whereas printing standard characters requires only one printhead pass. This results in a print speed benefit. In cases where glyph data is stored in a font file loaded into the memory of printer interface, transferring the glyph data to the printer can take time especially in the case of complex multilingual characters. Using standard glyph data stored in the font file loaded into the printer memory avoids this delay.

BRIEF DESCRIPTION OF THE DRAWINGS

Embodiments will now be described more fully with reference to the accompanying drawings in which.

DETAILED DESCRIPTION OF THE EMBODIMENTS

Figure 1:
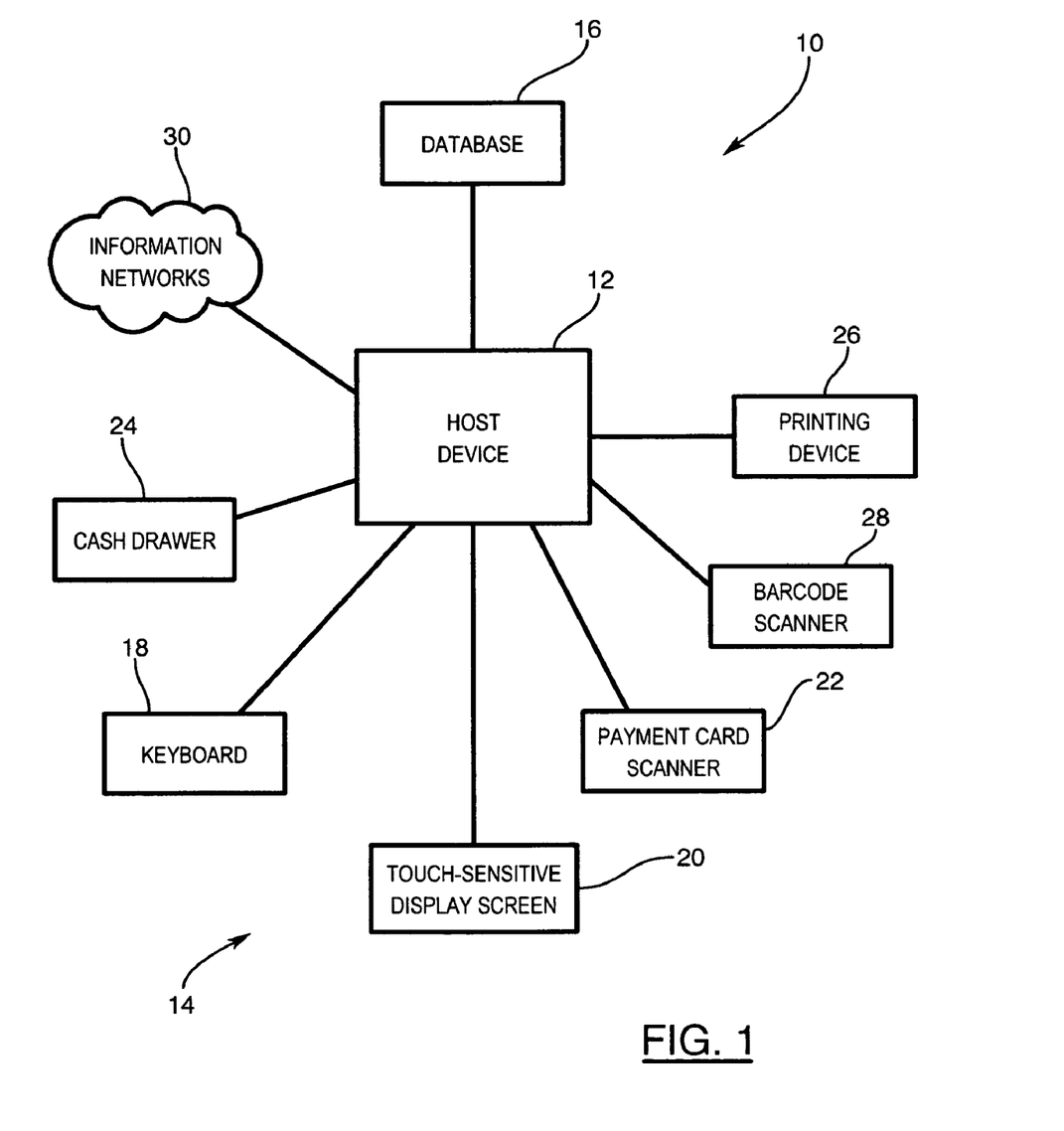
FIG. 1 is a schematic block diagram of a point-of-sale station including a printing device.

Turning now to FIG. 1, a point-of-sale (POS) station is shown and is generally identified by reference numeral 10. As can be seen, POS station 10 includes a microprocessor-based host device 12 in the form of a personal computer that communicates with a plurality of peripherals generally identified by reference numeral 14 and with a database 16 storing transaction, inventory, pricing, tax and accounting information. In this example, peripherals 14 include a keyboard 18, a touch-sensitive display screen 20, a payment card scanner 22, a cash drawer 24, a printing device 26 and a barcode scanner 28. Host device 12 also communicates with financial institutions (not shown) such as banks and credit card companies over one or more information networks generally identified by reference numeral 30.

Figure 2:
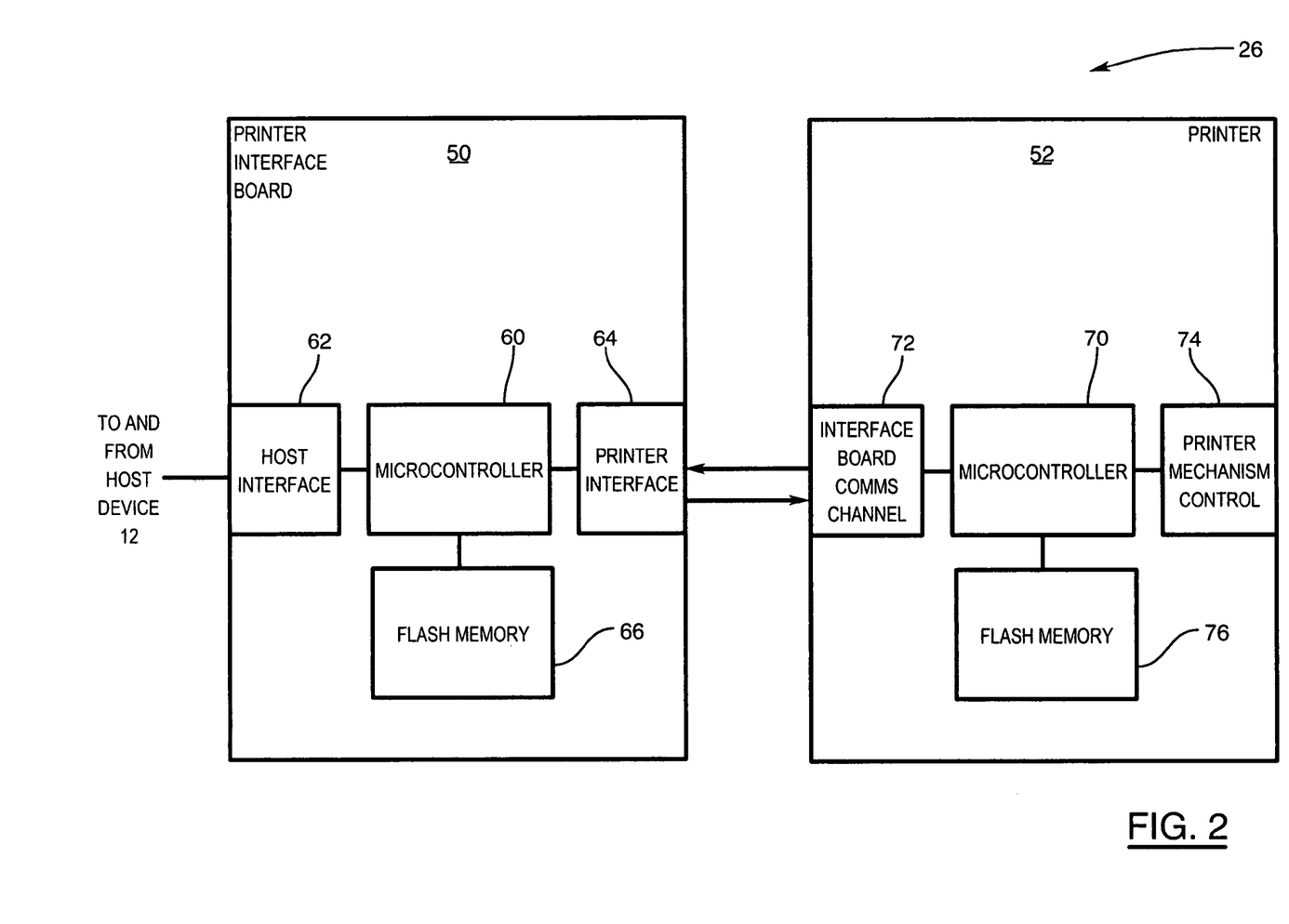
FIG. 2 is a schematic block diagram of the printing device of FIG. 1.

Printing device 26 is best illustrated in FIG. 2 and includes a printer interface 50 and a printer 52. Printer interface 50 comprises a microcontroller 60, a host interface board 62, a printer interface board 64 and non-volatile flash memory 66. Printer 52 comprises a microcontroller 70, a communications channel interface board 72, a printer control mechanism 74 and non-volatile flash memory 76. For example, the printer interface 50 may be of the type sold by EPSON under model No. UB-EML and the printer may be of the type sold by EPSON under model No. TM-U200.

The non-volatile memory 66 stores printer interface firmware that is executed by the microcontroller 60 during initialization and operation of the printing device 26 to permit communications between the host device 12 and the printer 52 and optionally to enhance operation of the printer by storing supplemental font files that allow the printer to print different font-type characters and/or emulation filed that allow the printer to emulate one or more other printer models.

The non-volatile memory 76 stores printer firmware that is executed by the microcontroller 70 during initialization and operation of the printing device 26 to allow the printer 52 to respond to commands generated by the host device 12 and print appropriate receipts when a transaction is completed. In this particular embodiment, the printer firmware includes a boot file, a main firmware file and a plurality of font files. The firmware also includes printer hardware and firmware identification information to enable the printer interface 50 to determine the type of printer 52 and the status of the resident printer firmware. For example, the printer hardware and firmware identification information includes the version string of the main firmware file, the version string of the boot file, the versions of the font files and the printer model identification number (ID). The printer model ID is a single data byte, the value of which is unique to the printer.

Each font file whether stored in the memory 66 or memory 76 holds glyph data relating to characters of one or more character sets that may be printed. Each font file comprises a file block header including an index of the file blocks therein, a file block header for each file block identifying each file block and its attributes, an index of the characters in each file block and the character or glyph data. The file block attributes may include for example, the font ID, the font version, the font type, the font length, the character length, the character height, the character width and the character format.

In the present embodiment, the printer firmware include two (2) font files. The first font file stores glyph data relating to characters in a multilingual character set. The characters in the multilingual character set include Chinese, Korean and/or Japanese characters as well as the full complement of Latin characters (letters A to Z, numbers 0 through 9, punctuation, special characters etc.). As will be appreciated, most if not all, multilingual characters are more complex than Latin characters. A significant number of the multilingual characters are also larger in size. To permit the multilingual characters to be printed without requiring special processing, larger and/or complex multilingual characters are segmented and represented by more than one character code, with each character code representing a different segment of a multilingual character. Glyph data representing each multilingual character segment is stored in the font file. When such a multilingual character is to be printed, the character codes representing all of the segments of the multilingual character are provided to the printer 52 allowing the appropriate glyph data to be extracted from the font file and the multilingual character printed.

Figure 3:
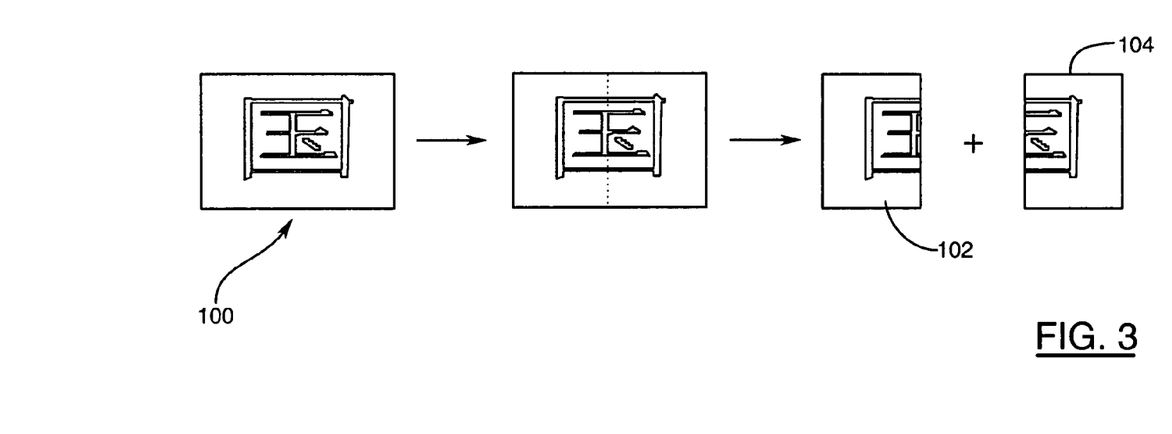
FIG. 3 shows a multilingual character divided into a pair of character segments.
Figure 4:
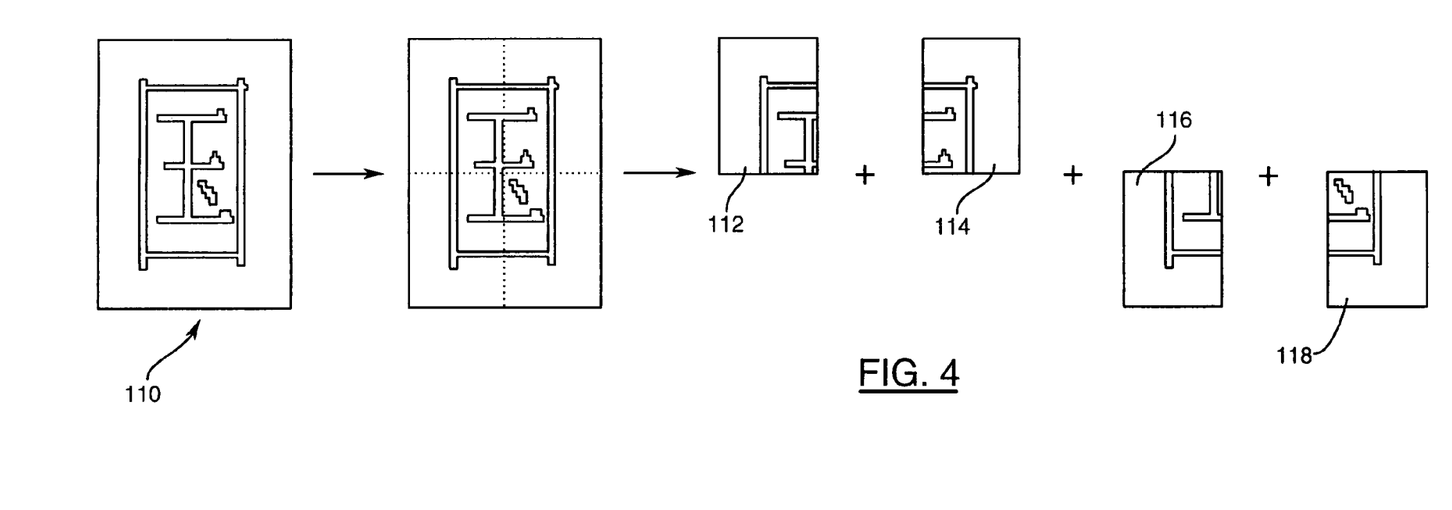
FIG. 4 shows a multilingual character divided into a 2×2 character segment array.

The number of segments into which a multilingual character is divided depends on the size and complexity of the multilingual character. For example, a small multilingual character 100 such as that shown in FIG. 3, may be divided into a pair of side-by-side character segments 102 and 104. A larger multilingual character 110 such as that shown in FIG. 4, may be divided into four character segments 112 to 118 arranged to form a 2×2 character segment array. Still larger multilingual characters may be divided into yet larger arrays of character segments.

The second font file stores glyph data relating to characters in a Latin character set. Thus, in this case the two font files store glyph data relating to equivalent characters.

Upon completion of a transaction, the host device creates a print job and transmits the print job as a single print data stream to the printing device 26. Preferably, the print data stream is formed in the manner disclosed in Applicants' co-pending application entitled "Method Of Forming A Print Data Stream With Embedded Commands", filed on even date and assigned to the present assignee, the content of which is incorporated by reference. The print data stream is received by the printer interface 50, which parses the print data stream into words and passes the words along to the printer 52 for processing.

When the print job requires printing of characters in the multilingual character set, the characters to be printed are represented by one or more double-byte character codes depending on the number of segments into which the multilingual character to be printed have been divided. When the print job requires printing of characters in the Latin character set, the characters to be printed are represented by single-byte character codes.

Figure 5:
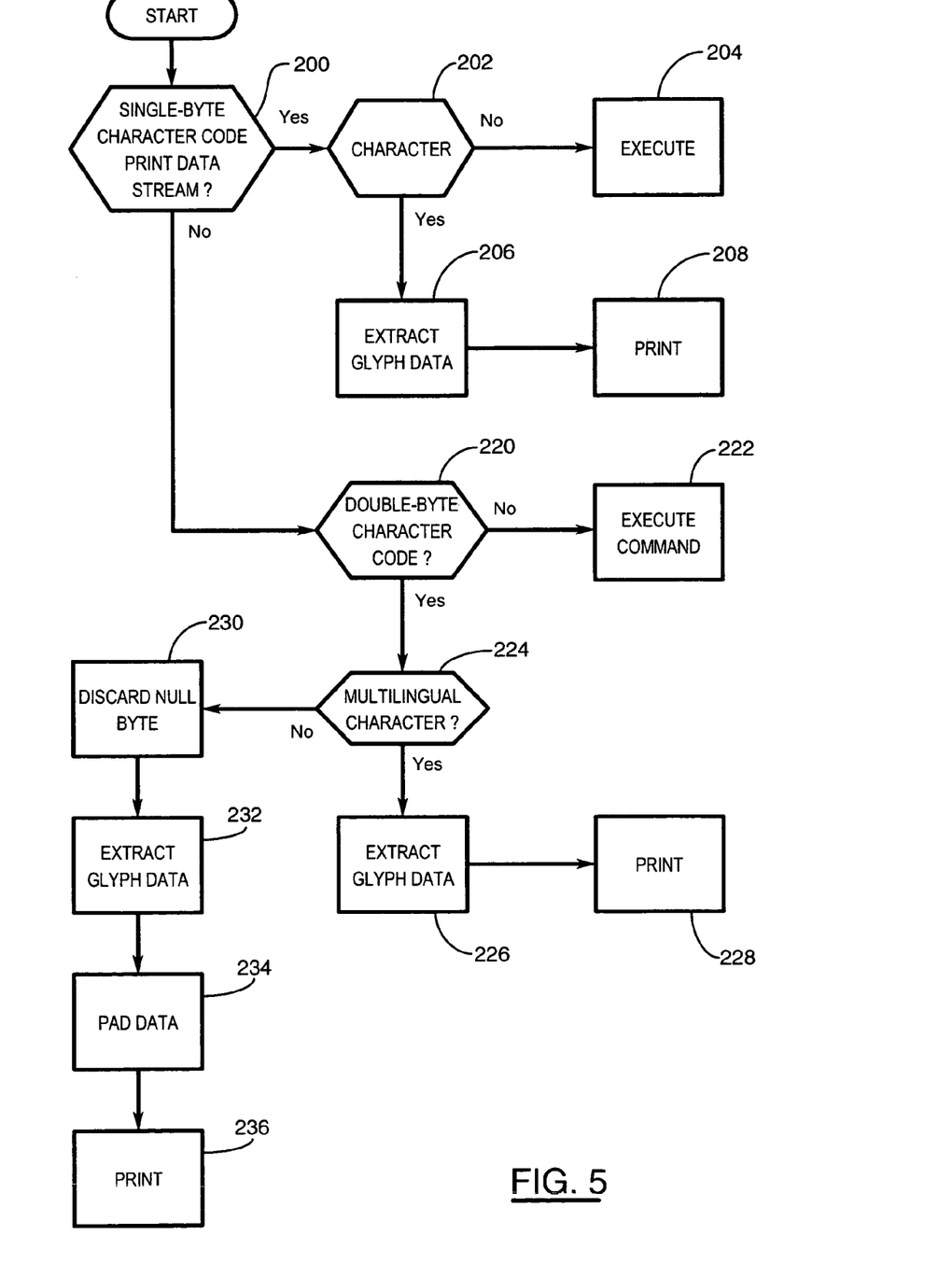
FIG. 5 is a flow chart showing the steps performed during printing of a character located within multiple character sets.

During parsing of a print job including a print data stream of single-byte character codes, the microcontroller 60 in the printer interface 50 segments the print data stream into single-byte words and conveys the single-byte words to the printer 52 (step 200 in FIG. 5). Upon receipt, the microcontroller 70 examines the single-byte words to determine whether the words represent characters or commands (step 202). When the words represent commands, the microcontroller 70 executes the commands (step 204). When the words represent characters, the microcontroller 70 uses the data in the words to extract the glyph data from the second font file corresponding to the characters to be printed (step 206). The microcontroller 70 in turn uses the extracted glyph data to print the characters (step 208).

During parsing of a print job including a print data stream of double-byte character codes, the microcontroller 60 segments the print data stream into data byte pairs and examines the data byte pairs to detect embedded single-byte commands. The microcontroller 60 then conveys the double-byte character codes and single-byte commands to the printer 52 (step 220). If a single-byte command is received, the microcontroller 70 executes the command (step 222). Upon receipt of a double-byte character code, the microcontroller 70 examines each double-byte character code to determine if the double-byte character code represents a multilingual character or segment or if the double-byte character code represents a Latin character (step 224). Latin characters represented by data byte pairs have most significant null data bytes. Examining the most significant data byte of each data byte pair allows the type of character (i.e. multilingual or Latin) represented by the data byte pair to be readily detected.

If the double-byte character code represents a multilingual character or segment, the microcontroller 70 uses the data in the data byte pair to extract glyph data from the first font file corresponding to the multilingual character or character segment to be printed (step 226). The microcontroller 70 in turn uses the extracted glyph data to print the multilingual character or character segment (step 228).

If the double-byte character code represents a Latin character, the microcontroller 70 automatically looks to the second font file for glyph data corresponding to the Latin character to be printed. In order to extract the glyph data from the second font file, the microcontroller 70 discards the most significant null data byte (step 230) and uses the remaining least significant data byte to extract the appropriate glyph data from the second font file (step 232). Once the glyph data has been extracted, the microcontroller 70 pads the glyph data with spaces so that when the Latin character is printed, it is of the same size as the multilingual characters in the set (step 234). During padding, the spaces can be placed to one side of the glyph data i.e the right or left, or equal spaces can be placed on opposite sides of the glyph data. The microcontroller 70 in turn uses the extracted and padded glyph data to print the Latin character (step 236).

As will be appreciated, the above method assumes that the Latin characters in each of the sets are equivalent. Corresponding Latin characters in the two character sets may of course have slightly different appearances. If appearance of printed characters is not of concern the above method works well. In this case, the step of padding the glyph data may also be omitted. If the spaces are omitted, the printed Latin character will simply be smaller than printed multilingual characters.

If appearance is of great concern, a more selective approach can be used to determine whether a jump to another font file is to be made to extract glyph data. It has been found that some Latin characters tend to be the same in every character set while other Latin characters tend to be different across different character sets. For example, the Latin characters from 20 to 7E hex tend to be consistent and are basically the same in every character set. Using this selective approach, a jump to another font file is only made when double-byte character codes representing consistent Latin characters are received i.e. character codes having a most significant null data byte and a least significant data byte in the 20 to 7E hex range. When character codes having a most significant null data byte and a least significant data byte in the 00 to 1F hex range or 7F to FF hex range are received, a jump to the second font file is not made. Rather, the data in the character code is used to extract the glyph data from the first font file.

Although the printer firmware is described as including two font files, those of skill in the art will appreciate that this is for ease of illustration only. The printer firmware may in fact store a large number of font files, some or all of which contain glyph data corresponding to equivalent characters. Some of the font files may of course be included in the printer interface firmware. In this case, when a jump from a font file in the printer interface firmware to a font file in the printer firmware is made, delays associated with transmitting glyph data from the printer interface 50 to the printer 52 are avoided.

Although specific reference is made to a printer used in a POS station, those of skill in the art will appreciate that this is for ease of illustration. The printer firmware update method is suitable for use in a variety of environments and with virtually any type of printer designed to accommodate a printer interface such as for example dot matrix printers, thermal printers, ink jet printers, laser printer etc.

Although embodiments have been described, those of skill in the art will appreciate that the variations and modifications may be made without departing from the spirit and scope of the invention as defined by the appended claims.

What is claimed is:

1. A method of managing the printing of characters by a printing device, said method comprising:
   providing said printing device a first font file storing first glyph data corresponding to a first set of characters, characters of said first set of characters being identified by double-byte words;
   providing said printing device a second font file storing second glyph data corresponding to a second set of characters, characters of said second set of characters being identified by single-byte words, wherein:
   upon said printing device receiving a double-byte word identifying a character within said first font file, determining whether the received double-byte word identifies a character that is also in said second set of characters;
   if not, using the received double-byte word to extract first glyph data from the first font file; and
   if so, using the received double-byte word to extract second glyph data from the second font file.

2. The method of claim 1 wherein the first set of characters includes multilingual characters and Latin characters and wherein the second set of characters includes Latin characters and lacks said multilingual characters.

3. The method of claim 2 wherein the multilingual characters consist of Asian characters.

4. The method of claim 2 wherein the received double-byte word is determined to identify a character from the second set of characters if the received double-byte word includes a null data byte.

5. The method of claim 4 wherein the null data byte is a most significant data byte.

6. The method of claim 2 wherein during the determining, the received double-byte word is examined to determine if the received double-byte word identifies a character within the second set of characters that has a generally identical appearance to a character in the first set of characters except for having a space-per-character requirement smaller than that of said first set of characters.

7. The method of claim 2 wherein the received double-byte word is determined to identify a character from the second set of characters if:
   the double-byte word includes a null data byte; and
   the non-null data byte within the double-byte word is determined to identify a character within the second set of characters that has a generally identical printable appearance to a character within the first set of characters identified by the double-byte word, and
   the value of the non-null data byte is within a specified range.

8. The method of claim 4 wherein the multilingual characters include Chinese characters, Korean characters, or Japanese characters, or some combination thereof.

9. The method of claim 6 wherein the multilingual characters include Chinese characters, Korean characters, or Japanese characters, or some combination thereof.

10. The method of claim 2 further comprising:
    adding printable blank spaces to said second glyph data extracted from the second font file, and not to said first glyph data extracted from the first font file.

11. The method of claim 10 wherein said printable blank spaces are added to only one side of said second glyph data.

12. The method of claim 10 wherein said printable blank spaces are added to opposite sides of said second glyph data.

13. The method of claim 1 further comprising:
    printing the character corresponded to by the extracted first or second glyph data, said extracted first or second glyph data containing information for graphically recreating the character corresponded to.

14. The method of claim 13 further comprising:
    adding printable blank spaces to said second glyph data extracted from the second font file.

15. The method of claim 14, wherein said printable blank spaces are added to only one side of the second glyph data.

16. The method of claim 14, wherein said printable blank spaces are added to opposite sides of the second glyph data.

17. The method of claim 14 wherein the printable blank spaces are sized so that during printing, the printed character from said second set of characters is generally the same size as the printed characters from said first set of characters.

18. The method of claim 17 wherein the first set of characters includes multilingual characters and Latin characters and wherein the second set of characters includes Latin characters.

19. The method of claim 18 wherein the multilingual characters include Chinese characters, Korean characters, or Japanese characters, or some combination thereof.

20. The method of claim 18 wherein the received double-byte word is determined to identify a character from the second set of characters if the double-byte word includes a null data byte.

21. The method of claim 20 wherein the non-null data byte of the received double-byte word is used to extract the second glyph data from the second font file.

22. A printing device comprising:
    a first font file storing first glyph data corresponding to a first set of characters, characters of the first set of characters being identified by multi-byte character codes;
    a second font file storing second glyph data corresponding to a second set of characters, characters of the second set of characters being identified by single-byte character codes; and
    a processor receiving character codes identifying characters to be printed during a print job, wherein:
    when received character codes identify characters in said second set of characters, said processor extracting second glyph data from said second font file corresponding to the identified characters for printing;
    when received character codes identify characters in said first set of characters, said processor examining each received character code to determine whether the received character code identifies a character that is also in the second set of characters, if not said processor extracting first glyph data from said first font file corresponding to the identified character for printing and if so, said processor extracting second glyph data from said second font file corresponding to the identified character for printing.

23. A printing device according to claim 22 wherein said first font file includes first glyph data corresponding to more than one type of character and wherein said second font file includes second glyph data corresponding only to western characters.

24. A printing device according to claim 22 wherein said first font file includes first glyph data corresponding to multilingual characters and Latin characters and wherein said second font file includes second glyph data corresponding to Latin characters and not to multilingual characters.

25. A printing device according to claim 24 wherein the multilingual characters include Chinese characters, Korean characters, or Japanese characters, or some combination thereof.

26. A printing device according to claim 22 wherein said processor adds printable spaces to extracted second glyph data when the received character codes identify characters in both the first and second set of characters.

27. A printing device comprising:
a first memory storing a first font file comprising first glyph data corresponding to a first set of identified by multi-byte character codes;
a second memory storing a second font file comprising second glyph data corresponding to a second set of characters identified by single-byte character codes; and
at least one processor configured to receive a character code representing a character to be printed during a print job, and, when the received character code identifies a character in the second set of characters, to extract second glyph data from the second font file corresponding to the identified character for printing, and, when the character code identifies a character in the first set of characters, to examine the received character code to determine whether the received character code identifies a character that is also in the second set of characters, and, if the received character code identifies a character that is also in the second set of characters, to extract second glyph data from the second font file corresponding to the identified character for printing.

28. A printing device according to claim 27 further comprising a printer interface and a printer, wherein the first memory is included in the printer interface and the second memory is included in the printer.

29. A method of managing the printing of characters by a printing device, said method comprising:
providing said printing device a first font file storing first glyph data corresponding to a first set of characters, characters within said first font file being identified by multi-byte words;
providing said printing device a second font file storing second glyph data corresponding to a second set of characters, characters of said second font file being identified by single-byte words, wherein:
upon said printing device receiving a multi-byte word that identifies a character within said first font file, determining whether the second font file contains an equivalent character;
if not, using the received multi-byte word to extract first glyph data from the first font file; and
if so, using the received multi-byte word to extract second glyph data from the second font file.

30. The method of claim 29, wherein the appearance the equivalent character from said second font file matches the appearance of the identified characters in said first font file.

31. The method of claim 29, wherein the appearance the equivalent character from said second font file is different from the appearance of the identified characters in said first font file.

32. The method of claim 29, wherein the printed space requirement of the equivalent character from said second font file is smaller than the printed space requirement of the identified character in said first font file, said method further comprising:
in addition to using the received multi-byte word to extract second glyph data from the second font file, adding printable blank space to said extracted second glyph data to increase the printable space of the equivalent character to match the printed space requirement of the identified character in said first font file.

33. The method of claim 29, wherein the received multi-byte word identifies a first sub-section of the identified character, said identified character being comprised of multiple sub-sections within said first font file, and printing of said identified character requiring a separate extraction of glyph data corresponding to each of said sub-sections within said first font file.

34. The method of claim 29, wherein the identified character within said first font file is comprised of multiple sub-characters within said first font file, glyph data for each sub-character being separately extractable for printing.

35. A printing device comprising:
a printer interface configured for communication with a host device, said printer interface having a first memory storing a first font file comprising first glyph data corresponding to a first set of characters;
a printer coupled to said printer interface, said printer having a second memory storing a second font file comprising second glyph data corresponding to a second set of characters, said second font file being different than said first font file;
wherein:
in response to receiving a code transmission that identifies a character within said first font file, said printer interface determining whether the second font file contains an equivalent character;
if not, then said printer interface using the received code transmission to extract first glyph data from said first font file, and transmitting the extracted glyph data to said printer; and
if so, then said printer interface conveying a character code for said equivalent character to said printer and not transmitting glyph data for said identified character to said printer, said printer responding to receipt of the conveyed character code by extracting second glyph data from said second font file.

36. The printing device of claim 35, wherein said first set of characters are identified by multi-byte character codes, and said second set of characters are identified by single-byte character codes.

37. The printing device of claim 35, wherein the appearance of the equivalent character from said second font file matches the appearance of the identified characters in said first font file.

38. The printing device of claim 35, wherein the appearance the equivalent character from said second font file is different from the appearance of the identified characters in said first font file.

39. The printing device of claim 35, wherein:
at least a plurality of characters within said first set of characters are composite characters comprised of a multiple sub-sections within said first font file, each sub-section having its own corresponding glyph data, and glyph data for each of said multiple sub-sections being required to be separately extracted from said first font file and separately transmitted to said printer for printing of said composite character; and
none of the characters within said second set of characters are composite characters.

* * * * *

UNITED STATES PATENT AND TRADEMARK OFFICE
CERTIFICATE OF CORRECTION

| | | |
|---|---|---|
| PATENT NO. | : 7,612,897 B2 | Page 1 of 1 |
| APPLICATION NO. | : 10/949546 | |
| DATED | : November 3, 2009 | |
| INVENTOR(S) | : Leonard B. Hodder | |

It is certified that error appears in the above-identified patent and that said Letters Patent is hereby corrected as shown below:

Column 9
Line 13, please change "a first set of identified" to --a first set of characters identified--.

Signed and Sealed this

Twenty-third Day of February, 2010

David J. Kappos
*Director of the United States Patent and Trademark Office*